Nov. 14, 1961  H. B. MATTHEWS  3,008,681
VEHICLE SEAT ADJUSTER
Filed Aug. 20, 1959  2 Sheets-Sheet 1
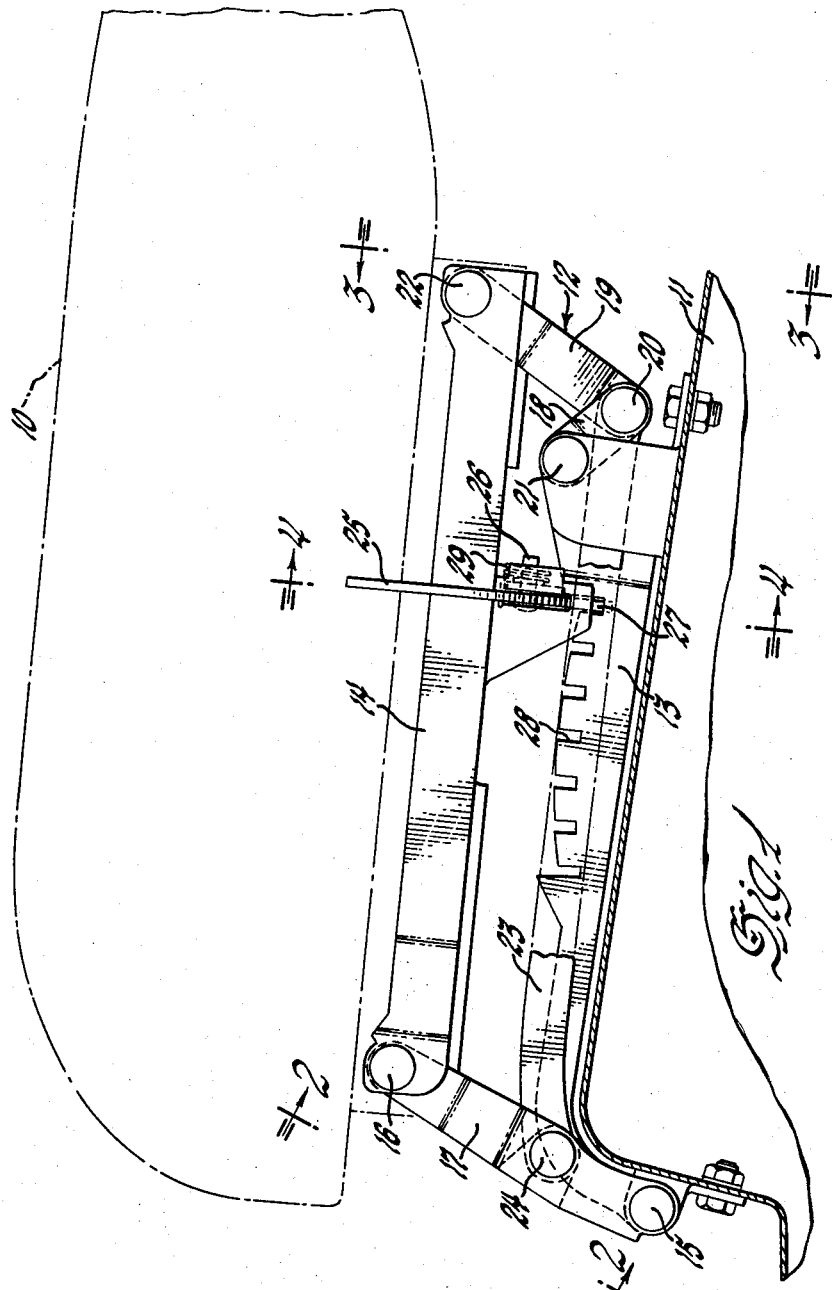
INVENTOR.
Hugh B. Matthews
BY
E.W. Christen
ATTORNEY

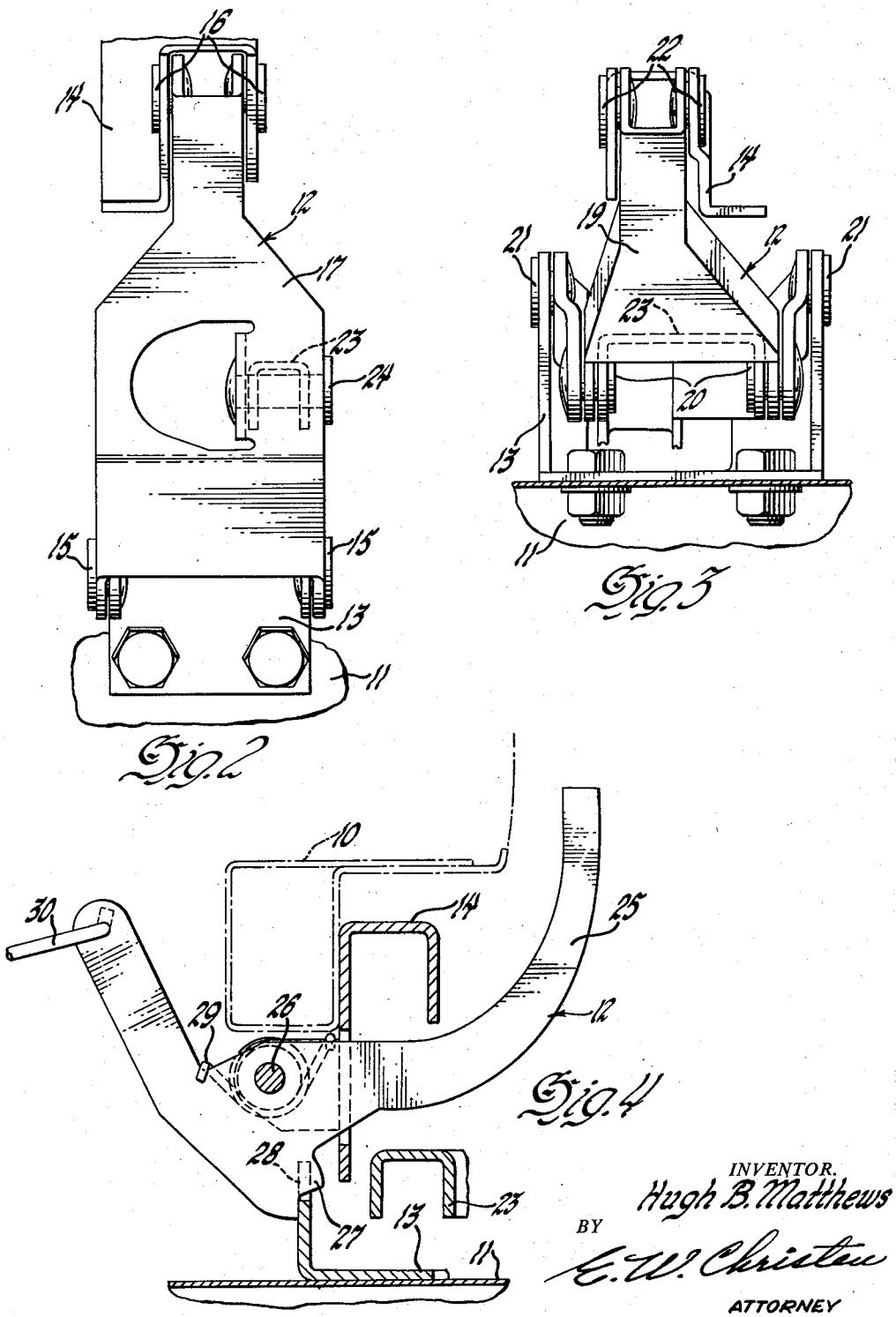

3,008,681
VEHICLE SEAT ADJUSTER
Hugh B. Matthews, Birmingham, Mich., assignor to General Motors Corporation, Detroit, Mich., a corporation of Delaware
Filed Aug. 20, 1959, Ser. No. 835,008
3 Claims. (Cl. 248—395)

This invention relates to vehicle seat adjusters and, more particularly, to a seat adjuster for providing substantially horizontal adjustment in the fore and aft direction without the use of the usual sliding track structure.

Horizontal seat adjusters commonly employ either slidable tracks or parallelogram linkages to obtain movement in fore and aft directions. Greater economy of manufacture can be obtained with the parallelogram linkage but the slidable track has found wider acceptance because of the objectionable component of vertical movement that is introduced by the parallelogram linkage. The object of the invention is to provide a linkage type horizontal seat adjuster that practically eliminates the vertical component of movement at the rear portion of the seat so that the occupant can urge the seat in fore and aft directions without undue effort.

In the drawings:
FIGURE 1 is a side elevation of the driver's side of a vehicle seat incorporating the inventive seat adjuster;
FIGURE 2 is a front elevation of the seat adjuster from the direction indicated by the line 2—2 of FIGURE 1;
FIGURE 3 is a rear elevation of the seat adjuster from the direction indicated by the line 3—3 of FIGURE 1, and
FIGURE 4 is a section taken on the plane indicated by the line 4—4 of FIGURE 1.

Referring to the drawings, a driver's seat 10 is supported on the vehicle floor 11 by a seat adjuster 12 at the left side of the seat and by a similar adjuster at the right side of the seat, not shown. The seat adjuster 12 includes a base channel member 13 which is fixed to the floor of the vehicle and a frame channel member 14 which is fixed to the bottom of the seat. The front ends of the base and frame members 13 and 14 have pivot connections 15 and 16 with a front link 17 so that the front end of the frame member 14 can shift forwardly and somewhat upwardly along an arc determined by the length of the front link 17. The rear ends of the base and frame members 13 and 14 are connected by a pair of links 18 and 19 which have a pivot connection 20 with each other and pivot connections 21 and 22 with the base and frame members 13 and 14. A connecting link 23 is provided to coordinate the movement of the front and rear links and has a pivot connection 24 with the front link 17 and connects to the rear link 18 through the pivot connection 20. The upper rear link 19 is approximately twice the length of the lower rear link 18 and the rear links are of lesser length than the front link 17.

The aforesaid linkage arrangement provides the seat frame member 14 with fore and aft adjustment relative to the floor base member 13 when the seat occupant urges the seat in fore and aft direction. The seat occupant may manipulate a locking lever 25 to secure the seat in various adjustment positions, the locking lever 25 having a pivot connection 26 to the frame member 14 and having a latch portion 27 that is swingable into engagement with a toothed catch portion 28 that is formed on the base member 13. A coil spring 29 is provided to urge the locking lever 25 to the latched position and a tie rod 30 connects to a similar latch mechanism at the other side of the seat so that both latch mechanisms operate together.

As was previously noted, the front portion of the seat 10 will follow a generally horizontal circular arc about the pivot connection 15 when the seat is urged in fore and aft direction. The rear portion of the seat, however, will have a substantially straight line horizontal movement because the pivot connection 20 which supports the upper rear link 19 will swing forwardly and downwardly about the fixed pivot connection 21 due to the forward force applied by the connecting link 23. The pivot connection 20 is located below the fixed pivot connection 21 in order to obtain the substantially horizontal straight line movement at the rear area of the seat and such movement allows the occupant to urge the seat in fore and aft directions with a minimum of effort because the center of gravity is in such area. If a single link were used at the rear portion of the seat corresponding to the single link at the front portion of the seat, the rear portion of the seat would swing upwardly in an arc and the occupant would have to apply additional force to lift himself.

It is to be understood that, although the invention has been described with specific reference to a particular embodiment thereof, it is not to be so limited since changes and alterations therein may be made which are within the full intended scope of this invention as defined by the appended claims.

I claim:
1. In a vehicle having spaced adjuster units extending longitudinally thereof and supporting a vehicle seat for adjustment in fore and aft directions, each adjuster unit comprising, a base member secured to the vehicle floor, a frame member supporting said seat, a front link having a lower pivot connection with the front portion of the base member and an upper pivot connection with the front portion of the frame member, a connecting link having a forward pivot connection with the front link between its lower and upper pivot connections to the base and frame members, a lower rear link having an upper pivot connection with the rear portion of the base member, an upper rear link having an upper pivot connection with the rear portion of the frame member and having a lower pivot connection with the lower rear link, the pivot connection of the rear links being located below the pivot connection of the lower rear link and base member, the connecting link having a rearward pivot connection to the lower rear link located below the pivot connection of the lower rear link and base member, the aforesaid linkage arrangement providing the rear portion of the frame member with substantially straight line movement during fore and aft adjustment relative to the base member, and latch means for latching the frame member to the base member in various adjustment positions.

2. In a vehicle having spaced seat adjuster units extending longitudinally thereof and supporting a vehicle seat for horizontal adjustment in fore and aft directions, each adjuster unit comprising, a base member for securement to the floor of the vehicle, a frame member for securement to the bottom of the seat, a front link having a lower pivot connection with the front portion of the base member and an upper pivot connection with the front portion of the frame member, a connecting link having a forward pivot connection with the front link between its lower and upper pivot connections to the base and frame members, a lower rear link having an upper pivot connection with the rear portion of the base member, an upper rear link having an upper pivot connection with the rear portion of the frame member and having a lower pivot connection with the lower rear link and the rearward portion of the connecting link, the pivot connection of the rear links and connecting link being located below the pivot connection of the lower rear link and base member, the front link being of greater length than the upper rear link and the upper rear link being of greater length than the lower rear link, the aforesaid linkage arrangement providing the rear portion of the frame member with substantially straight line movement during fore and aft adjustment relative to the base member, and latch means for latching the frame member to the base member in various adjustment positions.

3. The apparatus as defined in claim 2 and wherein said latch means comprises a latch plate having a curved upper surface and being secured to said base member and extending longitudinally therewith, a plurality of notches spaced along the curved upper surface of said latch plate, each of said notches having parallel side surfaces extending substantially radially outwardly to said curved upper surface, a locking lever fixed to said frame member and being movable therewith, and said locking lever being movement into and out of engagement with each of said notches as said seat is adjusted fore and aft.

References Cited in the file of this patent

UNITED STATES PATENTS

| | | |
|---|---|---|
| 1,664,129 | Pallenberg | Mar. 27, 1928 |
| 2,256,004 | Thomas | Sept. 16, 1941 |